Aug. 27, 1935.  U. QUINTAVALLE  2,012,770

CONNECTER FOR ELECTRIC CABLES

Filed March 23, 1934

Patented Aug. 27, 1935

2,012,770

UNITED STATES PATENT OFFICE 2,012,770

CONNECTER FOR ELECTRIC CABLES

Umberto Quintavalle, Milan, Italy, assignor to Fabbrica Italiana Magneti Marelli Societa' Anonima, Milan, Italy Application March 23, 1934, Serial No. 717,119 In Italy April 18, 1933

2 Claims. (Cl. 173—269)

This invention relates to connecters and has for its object a connecter for connecting an electric cable with a terminal or equivalent connecting part of an electric circuit, the connecter of this invention being particularly adapted for connecting an electric cable with a terminal of a sparking plug of a combustion engine having a connecting flanged head and a groove adjacent thereto.

On the annexed drawing is illustrated by way of example an embodiment of this invention and Figure 1 is a central longitudinal section of a connecter according to this invention affixed on a cable, said section being made on line 1—1 of Figure 3;

Figure 1:
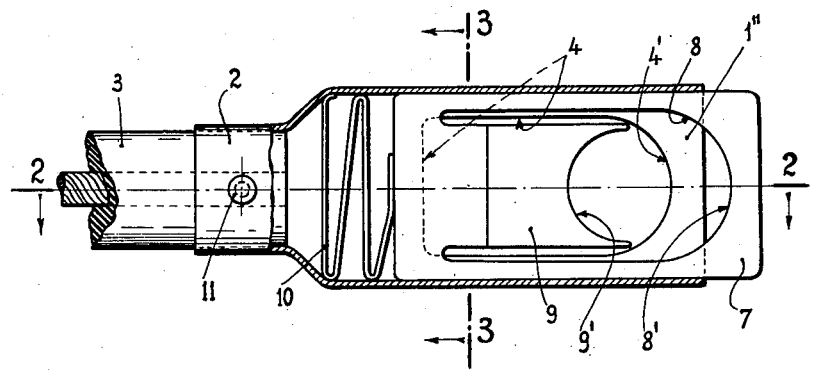

In the illustrated embodiment the connecter comprises a flat guideway consisting of two parallel and spaced plates 1, 1' connected with a socket 2 adapted to be located and fastened on the end portion of a cable 3 and to provide an electric connection therewith by means of a rivet 11 extending throughout said socket and cable; said plates 1, 1' have each a slot 4 which is confined at one end by a bridge portion 1" of said plates providing an arc-shaped edge 4' and has a size adapted to provide for insertion of the connecting head of the part with which the connecter is required to cooperate, such part in the illustrated example being the end of the central electrode 12 of a sparking plug which comprises a flanged head 5 and a groove 6 adjacent thereto.

Figure 2:
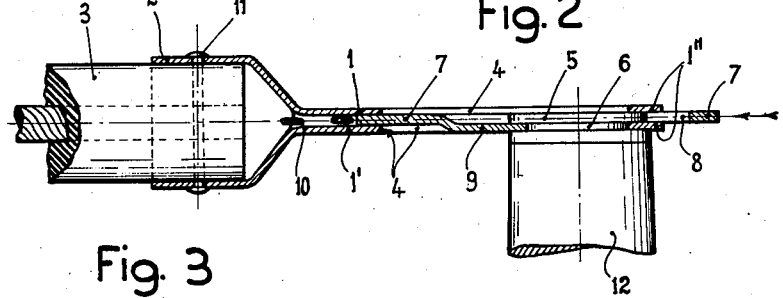
Figure 2 is a section of the connecter of Figure 1 affixed on the terminal of a sparking plug, on line 2—2 of Figure 1.
Figure 4:
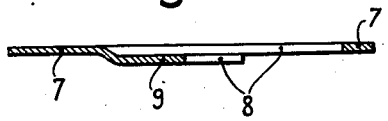
Figure 4 is a longitudinal section of a separate part of the connecter.

A slide 7 is mounted to move between plates 1, 1' and has a slot 8 confined by a circular arc 8' on a portion of its edge; said slide 7 extends beyond the end of plates 1, 1' and has a cut-in tongue 9 (Figure 4) which is transversely bent at its root to lie adjacent to the main portion of said slide and to enter the slot 4 of one of plates 1, 1' as shown in Figure 2. The end edge 9' of tongue 9 is shaped to an arc of a circle, and this arc-shaped edge 9' is opposite to edges 4' and 8' of slots 4 and 8.

Within the space enclosed between plates 1, 1' and adjacent socket 2, is located a spring 10 which acts on slide 7 to shift it with the free and arc-shaped end 9' of its tongue 9 towards the bridge portions 1" of plates 1 and 1' which provide the arc-shaped portions 4' of their slots 4.

The section of the connecter providing the socket 2 for the cable and the guide 1, 1' for the slide 7 is conveniently made of a length of metal tube which is flattened or depressed on a portion of its extent to provide the plates 1, 1' in which the slots 4 are then provided. The residual cylindrical portion of said tube provides the socket 2 in which the cable end is inserted and engaged by the rivet 11 extending throughout said socket and cable and acting both to fasten the connecter on the cable and to electrically connect the connecter with the conducting core of the cable. The tapering section 2' which connects plates 1, 1' with socket 2 provides an abutment for spring 10 acting on slide 7.

Figure 3:
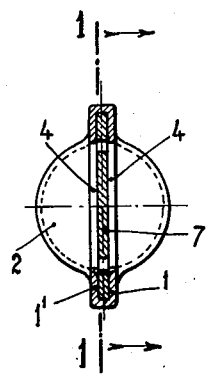
Figure 3 is a section on line 3—3 of Figure 1.

For affixing the connecter on a part of the kind illustrated in Figure 3 and comprising a stem 12 having a groove 6 and a flanged head 5 beyond such groove, the operator acts as shown by arrow in Figure 2 on the end of slide 7 which extends from the ends of plates 1, 1' and shifts said slide 7 against action of spring 10 into the guideway provided by said plates 1, 1' the arc-shaped end edge 9' of tongue 9 being thus removed from transverse bridges 1" of plates 1 and 1' and the free passage arising from registering slots 4 and 8 taking its maximum width; thereafter the operator affixes the connecter on the part 12, 6, 5 and engages the flanged head 5 of this part between respective bridges 1" of plates 1 and 1' thus causing the groove 6 to be entered by the edge of plate 1' in whose slot 4 the tongue 9 extends.

Finally the operator releases the slide 7 and then spring 10 causes this slide to engage the terminal and the arc-shaped edge 9' of tongue 9 thereof to enter the terminal groove 6; the connecter is thus firmly fastened on the terminal and any vibration or respective motion is prevented.

To remove the connecter from the terminal the operator acts again on slide 7 in the direction of the arrow in Fig. 2 to release the tongue 9 from groove 6; then the flange 5 may be released from plates 1, 1' and the connecter may be removed from the terminal.

By the described connecter a firm and safe connection is obtained which prevents any possible arching between the terminal and connecter as could be produced by vibrations or jolts, while the manipulations for affixing the connecter on the terminal and removing it therefrom are easy and simple.

Of course the described connecter is subject to changes in its construction and organization lying within the spirit of appended claims.

What I claim as my invention and desire to secure by United States Letters Patent is:—

1. A connecter for attaching an electric cable to a terminal, comprising a sleeve adapted to be connected to said cable and having a flattened portion providing two parallel spaced walls forming two side guideways and having registering openings for location on said terminal, a plate having an opening and mounted to slide in said guideways, a tongue integral with said plate and offset to enter said opening of one of said walls and to lie co-planar with the same, said tongue and said wall co-planar therewith providing opposite edges for engagement with said terminal, and a zig-zag spring located in said flattened portion of said sleeve and acting on said plate to force it and said tongue thereof with its engaging edge towards the opposite edge of said co-planar wall.

2. A connecter for attaching an electric cable to a terminal, comprising a sleeve adapted to be connected to said cable and having a flattened portion providing two parallel spaced walls forming two side guideways and having registering openings for location on said terminal, a plate having an opening and mounted to slide in said guideways, a tongue integral with said plate and offset to enter said opening of one of said walls and to lie co-planar with the same, said tongue and said wall co-planar therewith providing opposite edges for engagement with said terminal, and elastic means acting on said plate to force it and said tongue thereof with its engaging edge towards the opposite edge of said co-planar wall.

UMBERTO QUINTAVALLE.